(12) United States Patent
Slothouber et al.

(10) Patent No.: US 8,549,576 B2
(45) Date of Patent: Oct. 1, 2013

(54) DYNAMIC APPLICATION INSERTION FOR MPEG STREAM SWITCHING

(75) Inventors: Louis P. Slothouber, Leesburg, VA (US); Aaron Ye, Ashburn, VA (US); Allan V. Kotmel, Jr., Leesburg, VA (US); Marco J. Brown, Oakton, VA (US)

(73) Assignee: Fourtwall Media, Inc., Sterling, VA (US)

( * ) Notice: Subject to any disclaimer, the term of this patent is extended or adjusted under 35 U.S.C. 154(b) by 370 days.

(21) Appl. No.: 12/621,999

(22) Filed: Nov. 19, 2009

(65) Prior Publication Data

US 2010/0299715 A1 Nov. 25, 2010

Related U.S. Application Data

(60) Provisional application No. 61/116,204, filed on Nov. 19, 2008.

(51) Int. Cl.
*H04N 7/173* (2011.01)

(52) U.S. Cl.
USPC ............... 725/118; 725/93; 725/94; 725/95

(58) Field of Classification Search
USPC .................................... 725/93–95, 118
See application file for complete search history.

(56) References Cited

U.S. PATENT DOCUMENTS

| | | | |
|---|---|---|---|
| 6,481,012 B1* | 11/2002 | Gordon et al. | 725/54 |
| 8,132,203 B2* | 3/2012 | de Heer | 725/34 |
| 2002/0024967 A1 | 2/2002 | Zaun et al. | |
| 2006/0107302 A1* | 5/2006 | Zdepski | 725/135 |
| 2006/0130120 A1* | 6/2006 | Brandyberry et al. | 725/136 |
| 2007/0061724 A1 | 3/2007 | Slothouber et al. | |
| 2007/0276926 A1 | 11/2007 | LaJoie et al. | |
| 2008/0175148 A1 | 7/2008 | Todd et al. | |
| 2008/0276271 A1 | 11/2008 | Anderson et al. | |

OTHER PUBLICATIONS

CableLabs, OpenCable Application Platform Specifications: OpenCable Content Definition Format, Jan. 14, 2008,entire document.*
ANSI/SCTE 30 2006, "Digital Program Insertion Splicing API," American National Standard, Society of Cable Telecommunications Engineers, 2006.
ANSI/SCTE 35 2007, "Digital Program Insertion Cueing Message for Cable," American National Standard, Society of Cable Telecommunications Engineers, 2007.
Bontempi, Ray, "Advanced Advertising Progression: The Personalized Future," Communications Technology Magazine (on-line), Jul. 1, 2008, retrieved from the Internet at: http://www.cablefax.com/ct/video/30559.html.
Knops, Laura, "Advertising Solutions: Broadcast Ad Insertion," Microsoft Corp., Jul. 2004, retrieved from the Internet at: http://www.microsoft.com/windows/windowstmedia/howto/articles/adswm.aspx.
International Search Report and Written Opinion Jan. 13, 2010 for International Application No. PCT/US09/65169.

(Continued)

*Primary Examiner* — Hunter B Lonsberry
(74) *Attorney, Agent, or Firm* — Hunton & Williams LLP (57) ABSTRACT

Disclosed herein are methods and systems for dynamically creating and inserting an application into an MPEG program transport stream. The application may be subsequently run on a customer premises equipment (CPE) device to effect switching between content streams for presentation to viewers based on other available data, such as targeting information.

23 Claims, 6 Drawing Sheets

(56) References Cited

OTHER PUBLICATIONS

Supplemental European Search Report based on 09828229.6 mailed May 22, 2013.
OpenTable Guidelines Enhanced TV Operational Guidelines OC-GL-ETV-OG-V01-060714; Jul. 14, 2006; pp. 1-50; Cable Television Laboratories, Inc.
CableLabs ETV and DPI Demo; Oct. 26, 2006; pp. 1-15; Louisville, CO.
Enhanced TV Application Messaging Protocol 1.0;OC-SP-ETV-AM1.0-I04-070921; Sep. 21, 2007; pp. 1-25; Cable Television Laboratories, Inc.

* cited by examiner

DYNAMIC APPLICATION INSERTION FOR MPEG STREAM SWITCHING

CROSS REFERENCE TO RELATED APPLICATION

This patent application claims priority to U.S. Provisional Patent Application No. 61/116,204, filed Nov. 19, 2008, which is hereby incorporated by reference herein in its entirety.

BACKGROUND

MPEG transport streams contain one or more packetized elementary streams (PES) containing distinct (elementary) streams of video, audio, and data. Each such elementary stream is associated with a packet identifier (PID). The PIDs for the streams making up a particular program are defined in a program map table (PMT).

In digital television, typically one program (i.e., video, audio and data streams referenced by a single PMT) is active and displayed at any time.

Various techniques exist for targeting specific programs, including advertisements, to specific viewers based on information associated with the viewer's customer premises equipment (CPE) devices by splicing or otherwise identifying which streams to present to a viewer at a given time. The information used to make such targeting decisions represent the viewer's preferences in some way, for example by indicating a predefined segment the viewer belongs to or by other data indicative of viewer likes and dislikes. Targeting information can originate on the CPE device in response to viewer interaction with the device, or it can originate in the centralized headend location based on external information about the viewer. CPE devices include set-top boxes or integrated digital tuners attached to televisions, cell phones, PDAs, personal computers, and any other devices capable of decoding MPEG or other content streams and rendering the video, audio, and data contained therein.

Server-based targeting techniques perform dynamic splicing of multiple input MPEG transport streams into a single output program stream. This mechanism is defined by SCTE-30, the Digital Program Insertion Splicing API standard; SCTE-35, the Digital Program Insertion Cueing Message standard; and SCTE-130, the Addressable Advertising standard. However, server-based targeting techniques may have limitations. For example, every targeted viewer requires a distinct stream from the headend system. Scaling to a large number of viewers requires a large capital investment if every targeted viewer requires a separate stream. Also, viewer targeting information is required at the headend, possibly raising privacy concerns if the viewer information is gathered from CPE devices.

Client-based techniques employ an application executing on CPE devices to dynamically switch between simultaneously broadcast program streams based on viewer targeting information found on the CPE device. However, all program alternatives must be broadcast to all CPE devices, so that each may choose which to display. The broadcast to each CPE device may require, for example, significant bandwidth.

There are multiple mechanisms to dynamically switch between simultaneously broadcast program streams on CPE devices. One approach is to broadcast program alternatives on distinct channels. The CPE application switches between programs by changing channels (tuning) away from the primary broadcast channel to one of several hidden channels containing alternative program content. However, tuning on digital television CPE devices requires several seconds, providing a non-seamless transition, and requiring alternative programs to be shortened in some way.

A second approach is to multiplex the primary broadcast program stream and multiple alternate program streams within a single MPEG transport stream on a single channel. The CPE application switches between programs by selecting different PIDs to be displayed, providing a seamless transition. However, the extra bandwidth required within these channel transport streams may make the approach difficult or expensive to implement.

Both client-based mechanisms may also have other weaknesses. For example, program switching schedules and information must be transmitted to the CPE device from the headend and synchronized for all channels using the mechanism. Program switching schedules may also occupy scarce memory resources on legacy CPE devices. The switching application executing on the CPE device must be executing at all times to perform switches that may be scheduled for any time. The constant execution wastes CPU resources and slows other applications on legacy CPE devices. Late modification and updating of switching schedules on CPE devices may be difficult to implement. Finally, implementing the switching application as a native application or as part of a middleware application (e.g., EBT User Agent) requires a software update on all CPE devices to modify or fix the application, which may be difficult to execute.

SUMMARY OF THE DISCLOSURE

The following paragraphs are intended to summarize key elements of the current invention in an exemplary, non-limiting way.

Viewer targeting information is discovered on the CPE device based on viewer behavior, and/or transmitted to the CPE device from servers in the headend or other centralized broadcast location. This information is accessible to applications executing on the CPE device (e.g., Enhanced TV Binary Interchange Format (EBIF) applications).

CPE devices execute a common application execution engine or middleware (e.g., a standard-compliant EBIF User Agent) with the extensions necessary to switch between program streams on the current channel by specifying the PID of the program to display.

A primary program transport stream (e.g., a TV program with advertising) and multiple secondary programs (e.g., targeted video ads) are available to a multiplexer at the headend or other centralized broadcast location.

Schedules that define a mapping between viewer targeting information and PIDs for upcoming PID switching events are available to servers at the headend or other centralized broadcast location. PID switching event schedules may be provided to the server for one event at a time (e.g., as needed) or for many events in advance.

A hardware/software system may be implemented at the headend, or some centralized broadcast location, to effect the necessary PID switching based on the schedule and viewer-target-to-PID mapping information provided by dynamically generating a unique stream-switching application to perform each PID switching event and inserting the application into the transport stream ahead of the multiple video program alternatives. The system may dynamically generate a custom stream-switching application (e.g., EBIF application) to perform a PID switch based on targeting information available in the CPE device. The system may start with an already compiled, template application binary (e.g., in OpenCable Content Definition Format (CoDF format)) to perform the PID switch to an alternate video stream at the correct time, and then to switch back to the original video stream PID at the end of the alternate video. The system may then insert the timing and PID mapping table data directly into the binary form of the application. The system may insert the generated application and a corresponding switching application trigger into an MPEG transport stream, and multiplex (i.e., splice) the transport stream containing the generated application with the various alternate video streams into the primary program transport stream for broadcast out to CPE devices on a given channel. The primary program transport stream may, for example and without limitation, be a content stream. The alternate video streams may, for example and without limitation, be content streams showing advertising. On the CPE device, the application trigger is detected by the application execution engine or middleware (e.g., EBIF User Agent), and the generated stream-switching application transmitted with the primary stream is loaded and executed. The stream-switching application may retrieve the appropriate targeting or addressability information from the CPE device or application engine or middleware data (e.g., User Agent private actions), and may map this information to the appropriate PID or PIDs according to its built-in table. At the appropriate time, this stream-switching application switches the CPE to display the chosen alternate program PID or PIDs for the specified duration. After the duration, the stream-switching application may switch the CPE to display the original program's PID or PIDs. Reporting information may be collected or transmitted back to the headend as appropriate. Thereafter, the stream-switching application terminates and is deleted from the CPE device.

An embodiment of the present invention may include a method to insert an application for media stream switching. The method may comprise generating a custom PID stream-switching application, inserting the generated stream-switching application and a corresponding switching application trigger into one or more media transport streams, and multiplexing the media transport stream, using the generated stream-switching application, with at least one or more alternate media streams.

Further embodiments of a method to insert an application for media stream switching may comprise executing the generated stream-switching application on an application execution engine, or switching the media transport stream with one or more of the one or more alternate media streams according to the instructions in the generated stream-switching application.

Another embodiment of the present invention may include a system to insert an application for media stream switching. The system may comprise a module for generating a custom PID stream-switching application, a module for inserting the generated stream-switching application and a corresponding switching application trigger into one or more media transport steams, and a module for multiplexing the media transport stream with the generated stream-switching application and at least one or more alternate media streams. The modules in the system may comprise a programmed processor. The system may present images and/or data to an end user (e.g., via a display device such as a monitor or television), and the system may control the presentation of the images and/or data to the end user.

Further embodiments of a system to insert an application for media stream switching may comprise a module for executing the generated stream-switching application on an application execution engine, or a module for switching the media transport stream with one or more of the one or more alternate media streams according to the instructions in the generated stream-switching application.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF EXEMPLARY EMBODIMENTS

The following description is intended to convey a thorough understanding of the present invention by providing a number of specific embodiments and details involving inserting applications for media content stream switching. It is understood, however, that the present invention is not limited to these specific embodiments and details, which are exemplary only. It is further understood that one possessing ordinary skill in the art, in light of known systems and methods, would appreciate the use of the present invention for its intended purposes and benefits in any number of alternative embodiments, depending upon specific design and other needs.

Various embodiments are presented according to a system for digital television that targets specific digital video advertisements to viewers. In such a system the primary MPEG packetized elementary streams (PESs) may be a program broadcast on a given channel, along with its default, non-targeted advertising. The alternate MPEG PESs in the same program in the transport stream may be targeted advertisement alternatives, associated with targeting information (e.g., ad zones, audience segments, viewer descriptions/attributes) available in each CPE device. For example, in a nationally televised program, the televised program may be the primary MPEG PES. An advertisement for a restaurant only present in Texas, for example, may be an example of an alternate MPEG PES, as the advertisement may be targeted to viewers in Texas, or in Texas and a surrounding geographical area.

In such embodiments, the application execution engine (i.e., middleware) may be an EBIF User Agent. One possible application format is EBIF (Enhanced TV Binary Interchange Format), although other application formats may be used, and more than one application format may be used to create applications.

Although the environment for the invention described herein is digital cable television, certain embodiments of the invention may also be applicable to digital satellite television, IPTV, video on the Internet, or other environments, either alone or in combination.

Figure 1:
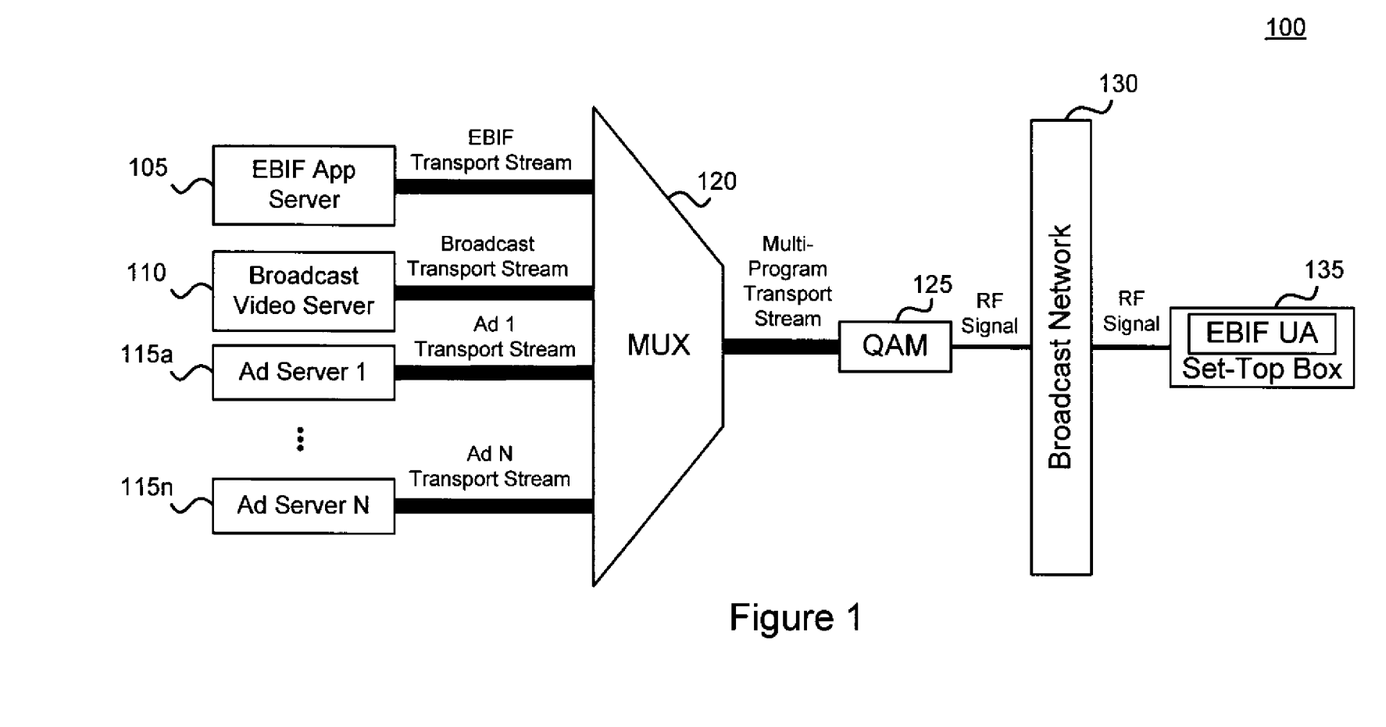
FIG. 1 is an exemplary diagram depicting an EBIF switching application insertion system in accordance with at least one embodiment of the present invention.

FIG. 1 shows an exemplary diagram depicting an EBIF stream-switching application insertion system in accordance with at least one embodiment of the present invention. According to an embodiment of the invention, a customized EBIF stream-switching application, or dynamic packet identifier switching application, is generated by an EBIF App Server 105 and included in an EBIF Transport Stream which may be multiplexed with Broadcast Video in a Broadcast Transport Stream and one or more Ad Transport Streams from Ad Servers 1-N. The resulting Multi-Program Transport Stream may be Quadrature Amplitude Modulated into, for example, an RF Signal. The RF Signal may then be distributed via a Broadcast network 130 to multiple CPE devices, represented in FIG. 1 by a single Set-top box 135. An EBIF User Agent on the Set-top box 135 detects an EBIF trigger which may cause the User Agent to load and execute the EBIF stream-switching application contained in the transport stream. The EBIF application retrieves the appropriate targeting information from the CPE device or User Agent data, and may map it to the appropriate PID(s) according to its built-in table. At the appropriate time, this EBIF application may switch the CPE to display to the chosen alternate program PID content(s) for the specified duration, and then may switch the CPE to display the original program's PID. The necessary reporting information may then be collected or transmitted back to the headend as appropriate. Thereafter, the EBIF application may terminate and may be deleted from the CPE device.

The EBIF App Server 105 may be a computer system to generate an EBIF stream-switching application. The EBIF App Server 105 may be a physical device commonly known in the art. For example, the EBIF App Server 105 may be implemented as a server. The EBIF App Server 105 may receive data from one or more inputs, produce data through one or more outputs, have or interface with one or more persistent storage devices for storing and retrieving data, and be in communication with one or more networks. The EBIF App Server 105 may operate using an operating system, and may load the operating system into memory in local persistent storage, for example, a hard drive, or may load the operating system into memory in shared storage across one or more networks. The EBIF App Server 105 may include instructions to create one or more EBIF stream-switching applications. The EBIF App Server 105 may have an EBIF template application binary, and may be operable to modify the EBIF template application binary with additional information, and to transmit the application over a network to the MUX 120. The EBIF App Server 105 may receive input regarding one or more PID switch events. The EBIF App Server 105 may use the switch event information to create an application using the EBIF template application binary, and may transmit the application to the MUX 120.

The Broadcast Video Server 110, and Ad Servers 1 to n 115a-115n, collectively "content servers," may be physical devices commonly known in the art. For example, the content servers may be implemented as servers. The content servers may receive data from one or more inputs, produce data through one or more outputs, have or interface with one or more persistent storage devices for storing and retrieving data, and be in communication with one or more networks. The content servers may operate using an operating system, and may load the operating system into memory in local persistent storage, for example, a hard drive, or may load the operating system into memory in shared storage across one or more networks. The Broadcast Video Server 110, and the Ad Servers 1 to n 115a-115n may be implemented as separate physical entities, or each of the content servers may reside on a single computer system, or a collection of machines operating as a single system. The content servers store and transmit content. For example, the Broadcast Video Server 110 may store and transmit television program content, or other audio and/or visual content. The Ad Servers 1 to n 115a-115n may store audio and/or video advertisements. Each of the content servers may transmit data to the MUX 120.

The MUX 120 may be a computer system or other hardware and/or software implementation to receive one or more data streams, and to combine the one or more data streams into a single multiplexed data stream for transmission. Shown in FIG. 1, the multiplexed data stream is depicted as the multi-program transport stream.

The QAM 125 may be a computer system or other hardware and/or software implementation to receive the multi-program transport stream, and to convert the stream into a form to transmit across the broadcast network 130. For example, the QAM 125 may use Quadrature amplitude modulation to turn the mutli-program transport stream into an RF Signal. The QAM 125 may also enable the multi-program transport stream to be broken into packets for transport across a packet-based network, or may modulate the multi-program transport stream so that it can be broadcast over another kind of radio frequency medium.

The broadcast network 130, or network, may be a wireless network, a wired network or any combination of wireless network and wired network. For example, broadcast network 130 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area network ("PAN"), D-AMPS, Wi-Fi, Fixed Wireless Data, IEEE 802.11a, 802.11b, 802.15.1, 802.11n and 802.11 g or any other wired or wireless broadcast network for transmitting and/or receiving a data signal. In addition, broadcast network 130 may include, without limitation, telephone line, fiber optics, IEEE Ethernet 802.3, a wide area network ("WAN"), a local area network ("LAN"), or a global network such as the Internet. Also, broadcast network 130 may support, an Internet network, a wireless communication network, a cellular network, or the like, or any combination thereof. Broadcast network 130 may be a hybrid fiber-coaxial network, a FTTx system, an IPTV system, or a terrestrial and/or satellite wireless system. Broadcast network 130 may further include one, or any number of the exemplary types of networks mentioned above operating as a stand-alone network or in cooperation with each other. Broadcast network 130 may utilize one or more protocols of one or more network elements to which it is communicatively coupled. Broadcast network 130 may translate to or from other protocols to one or more protocols of network devices. Although broadcast network 130 is depicted as one network, it should be appreciated that according to one or more embodiments, broadcast network 130 may comprise a plurality of interconnected networks, such as, for example, a service provider network, the Internet, a broadcaster's network, a cable television network, corporate networks, and home networks.

The CPE device, depicted in FIG. 1 as a set-top box 135, may be a device associated with a content consumer. The CPE device may be a physical device commonly known in the art. For example, the CPE device may be implemented as computerized system. The CPE device may receive data from one or more inputs, produce data through one or more outputs, have or interface with one or more persistent storage devices for storing and retrieving data, and be in communication with one or more networks. The CPE device may operate using an operating system, and may load the operating system into memory in local persistent storage, for example, a hard drive, or may load the operating system into memory in shared storage across one or more networks. The CPE device may also receive and execute commands received from inputs. For example, the CPE device may be operable to execute commands received from the EBIF App Server 105 via the broadcast network 130. The CPE device may be operable to execute an EBIF user agent. While a single set-top box 135 is depicted in the example, any number or type of CPE device may be used. For example, a CPE device may be a computerized system in communication with a television or other display device, or a CPE device may be, for example, a computer in communication with a computer monitor, or a cellular telephone operable to receive and display content. The CPE device may also be another type of system to receive signals from a broadcast network 130 and display the signals for a content consumer. The EBIF user agent may execute on a CPE device, and may be operable to receive commands from the broadcast network 130 as an input, and execute the commands.

Figure 2:
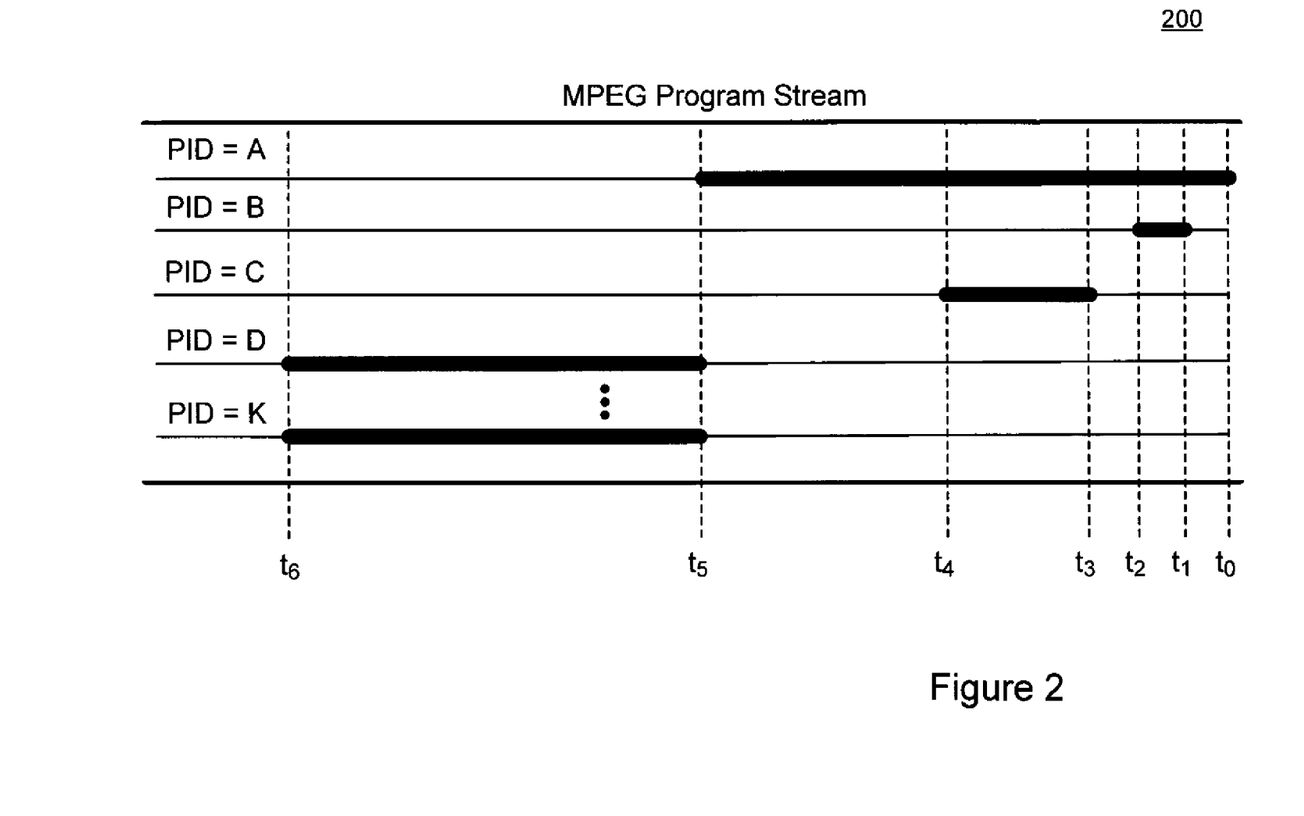
FIG. 2 is an exemplary diagram depicting MPEG program stream contents in accordance with at least one embodiment of the present invention.

Referring now to FIG. 2, an exemplary MPEG Program Stream 200 is shown in accordance with at least one embodiment of the present invention. The exemplary MPEG Program Stream depicts elementary streams of video, audio, and data labeled by PIDs A, B, C, D, and K each indicating time intervals ($t_0$-$t_6$), wherein each stream may contain active content. In this example, PID A represents the original broadcast video stream, and $t_0$ represents the arbitrary time when the current program stream begins. At time $t_1$ a new PMT may appear on PID B, as needed, and which completes by time $t_2$. At time $t_3$ the EBIF application trigger is detected, shown in PID C, and the EBIF stream-switching application loaded and executed, ending at time $t_4$. These two operations need not necessarily occur in sequence, and they may overlap. The EBIF application may be loaded and executed before the content stream it references is transmitted. The EBIF application may be received before the original broadcast video stream is received, or may be received after the original broadcast video stream is received, or while the original broadcast video stream is also being received. At time $t_5$ the EBIF application may make the PID switch or switches by switching to one or more of PID D to PID K according to the schedule provided to the EBIF App Server 105 and included in the EBIF application. The time gap between time $t_4$ and time $t_5$ should be sufficient for the EBIF app to be loaded, executed, and for it to query the PMT and prepare for its PID switching task. At time $t_6$ the EBIF application may switch back to the primary broadcast PID, in this example, PID A, and may generate the appropriate reporting information to be collected on the headend or centralized server location. The times that occur between the time points $t_0$ through $t_6$ are arbitrary, and may be zero.

Figure 3:
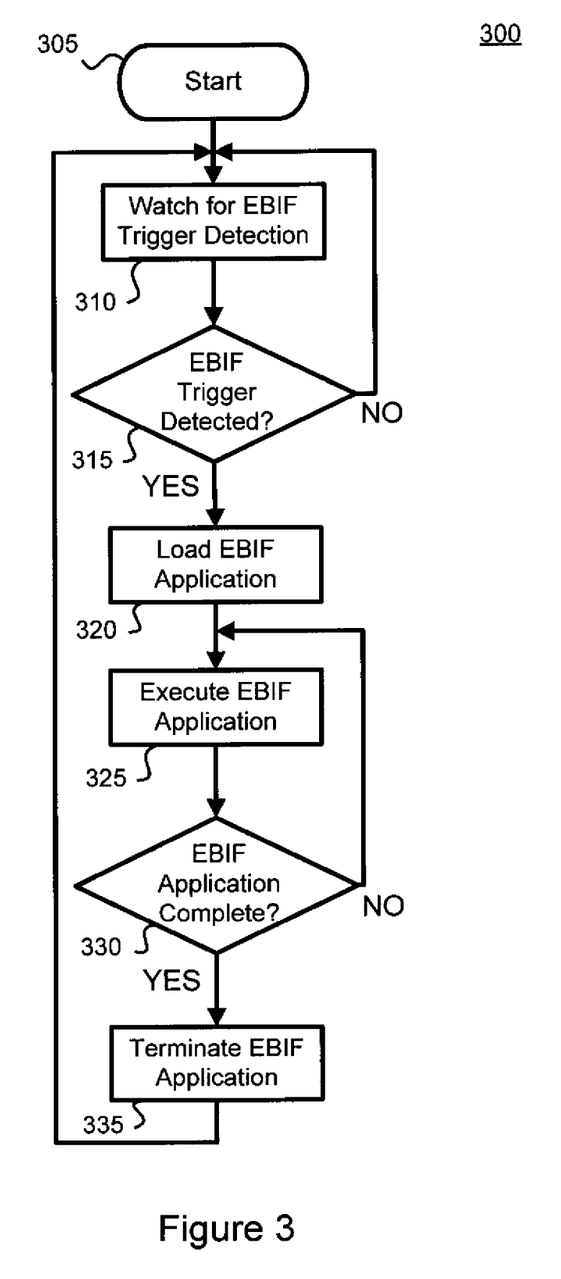
FIG. 3 is an exemplary flowchart depicting an EBIF user agent process in accordance with at least one embodiment of the present invention.

Referring now to FIG. 3, a flowchart is depicted detailing processing done by the EBIF User Agent in accordance with at least one embodiment of the present invention. The process 300 begins at step 305. At step 310, the User Agent watches for an EBIF trigger. In step 315, if an EBIF trigger is not detected by the User Agent, the User Agent may continue to watch for an EBIF trigger, and return to step 310.

In step 320, if an EBIF trigger is detected in step 315, the customized EBIF stream-switching application created and inserted into the MPEG transport stream by the EBIF App Server 105 is loaded into memory of the CPE device.

In step 325, the EBIF stream-switching application loaded into the memory of the CPE device is executed by the CPE device.

In step 330, if the EBIF stream-switching application is not complete, the CPE device may continue to execute the application, and return to step 325. If the EBIF stream-switching application is complete, the EBIF application may be terminated, shown in step 335.

When the EBIF stream-switching application is terminated, the User Agent associated with the CPE device may return to the beginning of the method 300, and may watch for the next trigger, returning to step 310. The CPE device may, for example, unload the EBIF stream-switching application from memory.

Figure 4:
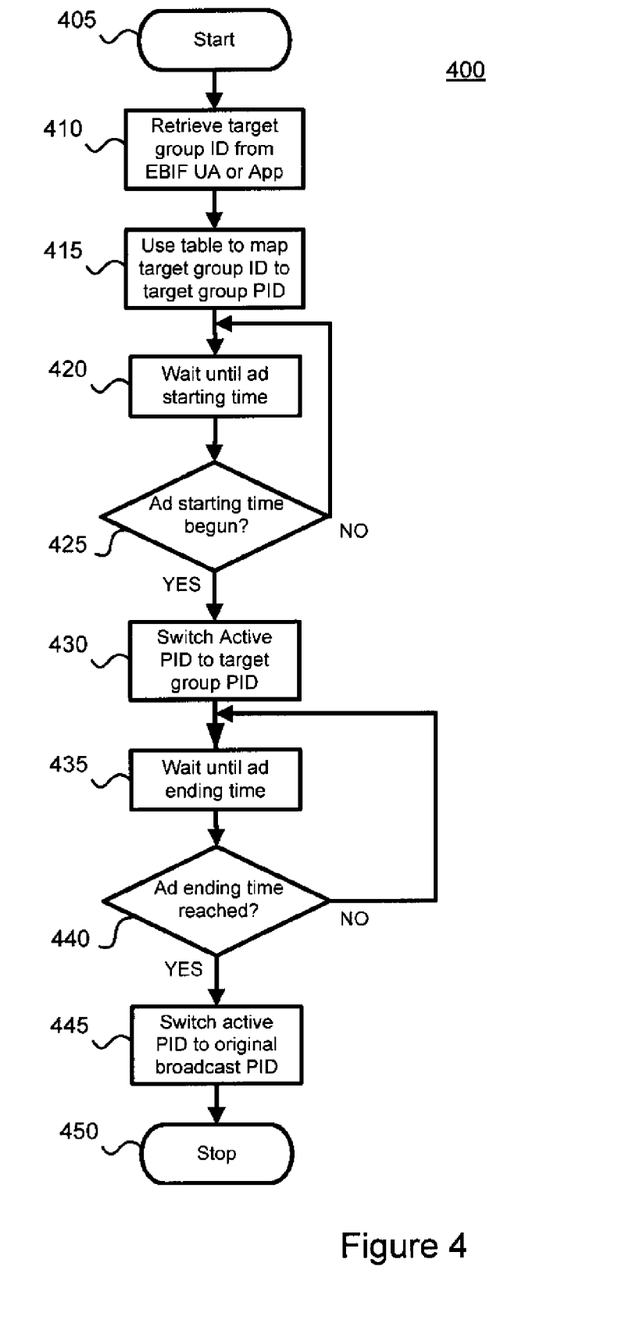
FIG. 4 is an exemplary flowchart depicting a MPEG stream switching EBIF application process in accordance with at least one embodiment of the present invention.

Referring now to FIG. 4, an exemplary flowchart depicting a MPEG stream switching EBIF application process in accordance with at least one embodiment of the present invention is shown. In the method 400 shown, the EBIF stream-switching application may begin at step 405 by retrieving a target group ID from the EBIF User Agent or Application shown in step 410. The target group ID is used to indicate the likes and dislikes of the current viewer or household (e.g., what market segment the viewer belongs to, or other information regarding the current viewer or household).

Shown in step 415, the EBIF application may then use a table to map the target group ID to target group PID(s). The table may be located or created at the CPE device.

The EBIF application then waits until an advertisement starting time is reached, shown in step 420. The advertisement starting time may be associated with the PID of the specific advertisement, and may be located in the EBIF application. If the advertisement starting time is not reached, the EBIF application may continue to wait, and return to step 420.

When advertisement starting time begins, the EBIF application may switch the Active PID to the target group PID(s), shown in step 430. The content indicated by the target group PID(s) may be presented while the application waits until advertisement ending time, shown in step 435.

In step 440, if the advertisement ending time is not reached, the EBIF application may wait until the advertisement ending time, and return to step 435.

Upon advertisement ending time, the EBIF application may switch the Active PID back to the original broadcast PID, shown in step 445, and the method stops, shown in step 450.

Figure 5:
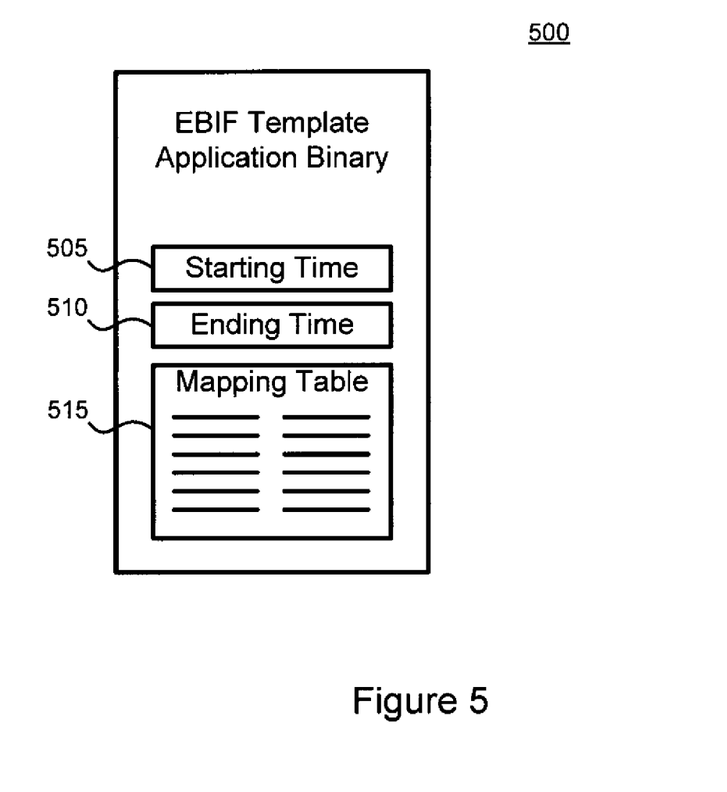
FIG. 5 is an exemplary diagram depicting an EBIF template application binary with slots for PID switch event data in accordance with at least one embodiment of the present invention.

Referring now to FIG. 5, an exemplary diagram depicting an EBIF template application binary 500 with slots for PID switch event data in accordance with at least one embodiment of the present invention is shown. The EBIF template application binary 500 may form a part or a template for an EBIF stream-switching application, where the template may be used with additional information to create an EBIF stream-switching application. Fixed memory locations within the binary data may be identified where schedule data and targetto-PID mapping table are to be inserted. The appropriate starting times 505, ending times 510, and mapping table contents 515 are inserted into this structure by the EBIF App Server 105 for subsequent execution by the EBIF User Agent on CPE devices, without recompiling the binary. The EBIF template can also be alternatively configured to allow dynamic customization by the App Server to effect the appropriate switching on the CPE device.

Figure 6:
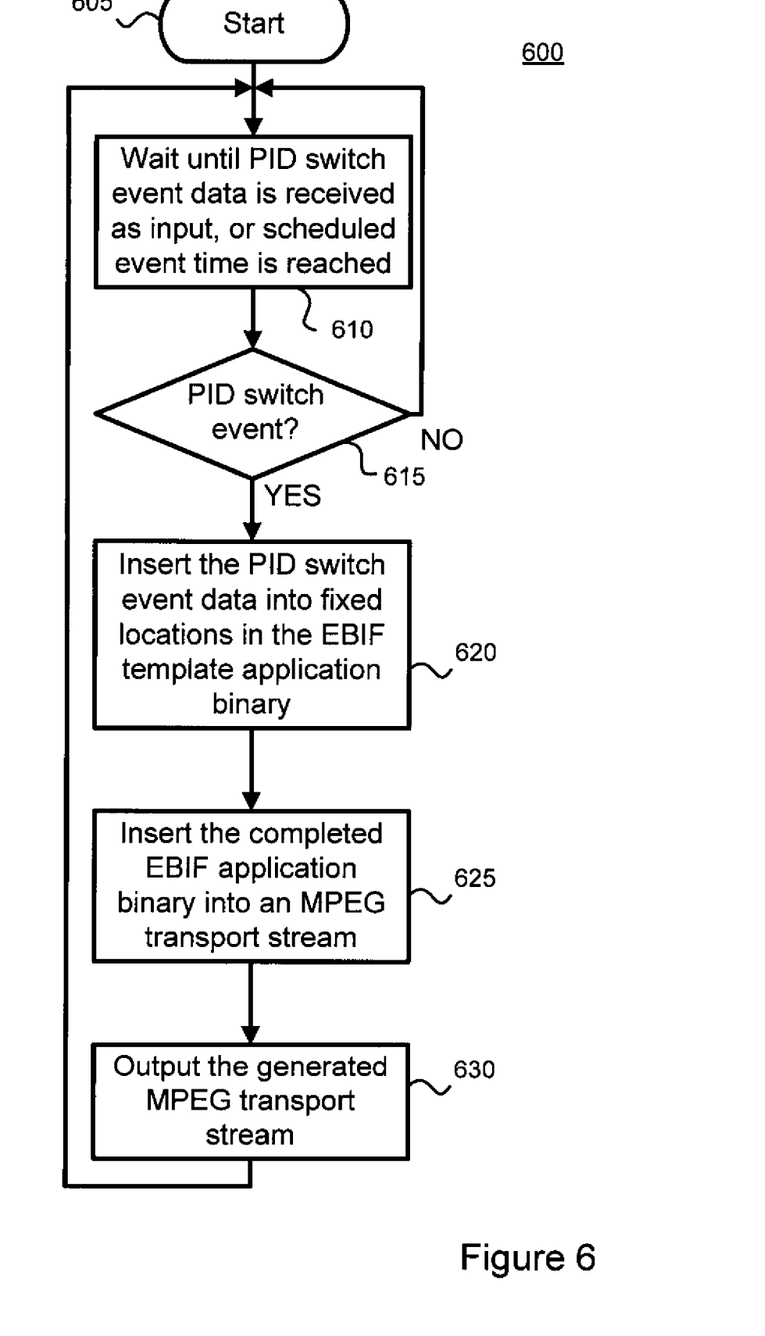
FIG. 6 is an exemplary flowchart depicting a dynamic EBIF application insertion process in accordance with at least one embodiment of the present invention.

Referring now to FIG. 6, an exemplary flowchart depicting a dynamic EBIF stream-switching application insertion process in accordance with at least one embodiment of the present invention is shown. The method 600 may begin at step 605. In step 610, the EBIF App Server 105 may wait until PID switch data is received as input or until a scheduled event time is reached.

In step 615, a PID switch event may be detected. If a PID switch event is not detected, the method 600 may continue to wait, and may return to step 610. When a HD switch event is detected, PID switch event data may be inserted into fixed locations in the EBIF template binary application, shown in step 620.

In step 625, the completed EBIF application binary, which may also be known as the EBIF stream-switching application, may be inserted into an MPEG transport stream.

In step 630, the generated MPEG transport stream may be output as part of the complete Multi-Program Transport Stream and the process resumes waiting for additional switch event data.

It is to be appreciated that the present disclosure as described above typically involves the processing of input data and the generation of output data to some extent. This input data processing and output data generation may be implemented in hardware or software. Also, the set of instructions, e.g., the software, that configures the computer operating system or operating systems to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

What is claimed:

1. A method for generating a stream-switching application, comprising:
    identifying a first content stream and a second content stream;
    creating packet identifier mapping data including information to identify the first content stream and the second content stream;
    creating timing data to switch from the first content stream to the second content stream at a first time and to switch from the second content stream to the first content stream at a second time;
    generating a stream-switching application including at least the packet identifier mapping data, the timing data, and a trigger for signaling the stream-switching application to be loaded and executed on an electronic device;
    transmitting the first content stream;
    transmitting the stream-switching application; and
    transmitting the second content stream, wherein the stream-switching application is transmitted along with at least one of the first content stream and the second content stream to the electronic device.

2. The method of claim 1, further comprising transmitting one or more additional content streams with the first content stream and the second content stream.

3. The method of claim 1, wherein the stream-switching application further includes a pre-compiled template application binary, and the packet identifier mapping data and the timing data are inserted into the template application binary to generate the stream-switching application.

4. The method of claim 3, wherein the template application binary is encoded using OpenCable Content Definition Format (CoDF).

5. The method of claim 1, wherein the stream-switching application is inserted into an MPEG stream and the packet identifier mapping data includes MPEG Packet Identifiers (PIDs) to identify the first content stream and the second content stream.

6. The method of claim 1, wherein the first content stream comprises programming content.

7. The method of claim 1, wherein the second content stream comprises alternative advertisement content.

8. The method of claim 1, wherein the stream-switching application is an Enhanced TV Binary Interchange Format (EBIF) application.

9. The method of claim 1, further comprising receiving data from a consumer device, the data including information regarding the first content stream and the second content stream.

10. An apparatus for generating a stream-switching application, comprising:
    an identifying processor that identifies a first content stream and a second content stream;
    a mapping processor that creates packet identifier mapping data including information to identify the first content stream and the second content stream;
    an electronic module operable to create timing data to switch from the first content stream to the second content stream at a first time and to switch from the second content stream to the first content stream at a second time;
    an application server that generates a stream-switching application using the packet identifier mapping data, the timing data, and a trigger for signaling the stream-switching application to be loaded and executed on an electronic device and transmits the stream-switching application;
    a first transmitter that transmits the first content stream; and
    a second transmitter that transmits the second content stream , wherein the stream-switching application is transmitted along with at least one of the first content stream and the second content stream to the electronic device.

11. The apparatus of claim 10, further comprising transmitting one or more additional content streams with the first content stream and the second content stream.

12. The apparatus of claim 10, wherein the stream-switching application further includes a pre-compiled template application binary, and the packet identifier mapping data and the timing data are inserted into the template application binary to generate the stream-switching application.

13. The apparatus of claim 12, wherein the template application binary is encoded using OpenCable Content Definition Format (CoDF).

14. The apparatus of claim 10, wherein the stream-switching application is inserted into an MPEG stream and the packet identifier mapping data includes MPEG Packet Identifiers (PIDs) to identify the first content stream and the second content stream.

15. The apparatus of claim 10, wherein the first content stream comprises programming content.

16. The apparatus of claim 10, wherein the second content stream comprises alternative advertisement content.

17. The apparatus of claim 10, wherein the stream-switching application is an Enhanced TV Binary Interchange Format (EBIF) application.

18. The apparatus of claim 10, further comprising receiving data from a consumer device, the data including information regarding the first content stream and the second content stream.

19. A method for switching content streams, comprising:
receiving, at an electronic customer device, a stream-switching application, the stream-switching application comprising at least timing data, packet identifier mapping data, and trigger data for signaling the stream-switching application to be loaded and executed on the electronic customer device;
executing the stream-switching application, comprising:
extracting timing data from the stream-switching application, including a first time and a second time, the first time occurring before the second time; and
extracting packet identifier mapping data from the stream-switching application, the packet identifier mapping data including information to identify a first content stream and one or more second content streams;
receiving the first content stream at the electronic customer device;
receiving the one or more second content streams at the electronic customer device, wherein the stream-switching application is received along with at least one of the first content stream and the second content stream;
switching, at the first time, from processing the first content stream to processing one or more of the second content streams; and
switching, at the second time, from processing, the one or more of the second content streams to processing the first content stream.

20. The method of claim 19, wherein the first content stream and the at least one second content stream comprise video and audio.

21. The method of claim 19, wherein the processing of the first content stream and the one or more second content stream includes displaying the content.

22. The method of claim 19, wherein after the stream-switching application has completed executing, it is deleted from the customer device.

23. The method of claim 19, further comprising transmitting data, the data including information regarding the first content stream and the second content stream.

* * * * *

UNITED STATES PATENT AND TRADEMARK OFFICE
CERTIFICATE OF CORRECTION

| | | |
|---|---|---|
| PATENT NO. | : 8,549,576 B2 | Page 1 of 1 |
| APPLICATION NO. | : 12/621999 | |
| DATED | : October 1, 2013 | |
| INVENTOR(S) | : Slothouber et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 487 days.

Signed and Sealed this
Seventeenth Day of February, 2015

Michelle K. Lee
*Deputy Director of the United States Patent and Trademark Office*